April 21, 1970 JAMES E. WEBB 3,507,704
ADMINISTRATOR OF THE NATIONAL AERONAUTICS
AND SPACE ADMINISTRATION
ELECTROLYTICALLY REGENERATIVE HYDROGEN-OXYGEN FUEL CELL
Filed May 17, 1967 3 Sheets-Sheet 1
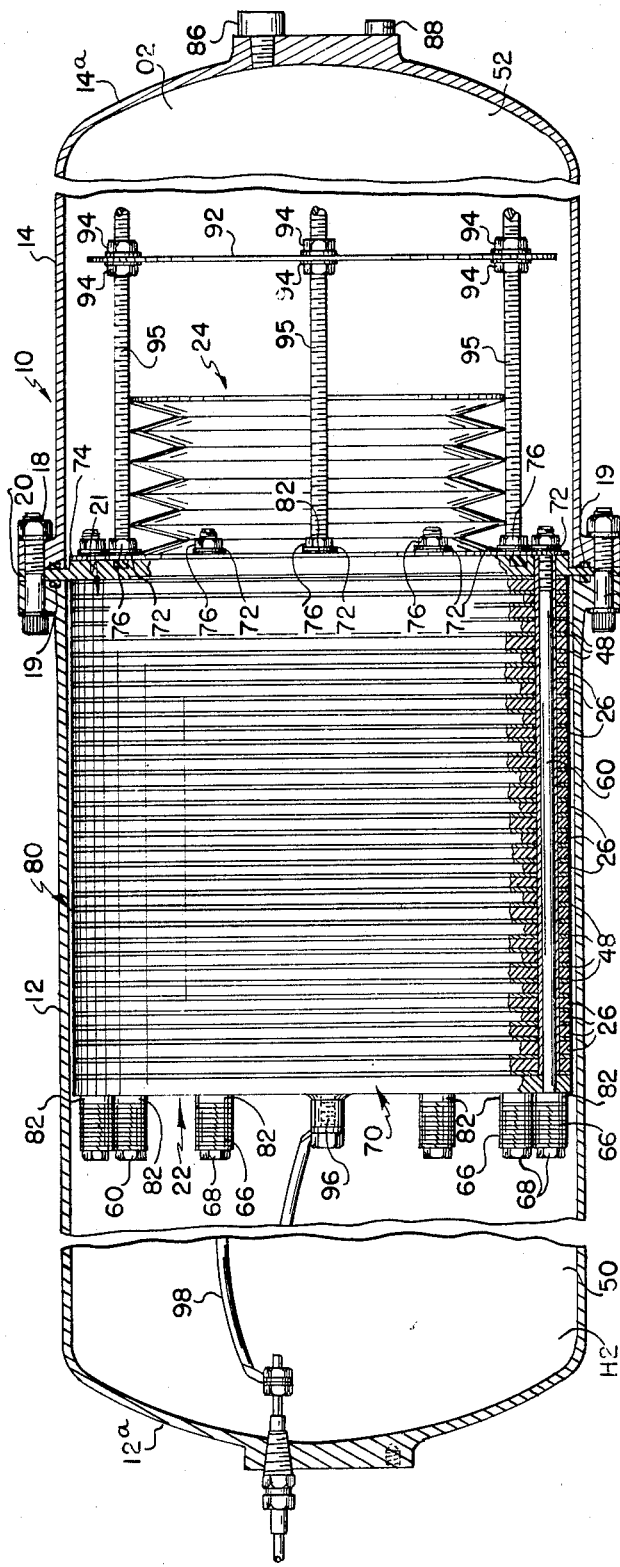
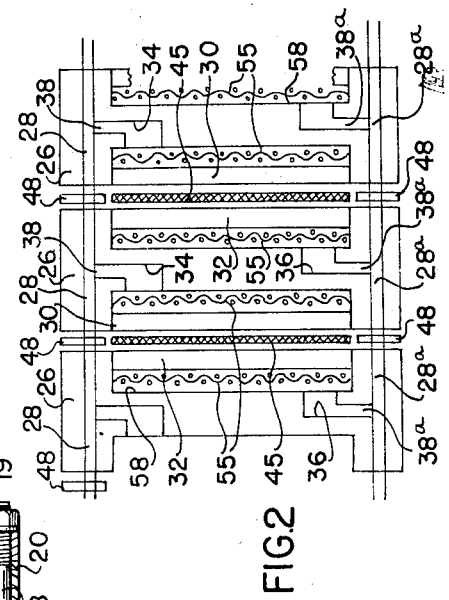
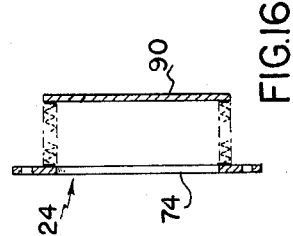
INVENTORS
BERNARD M. WILNER
HARVEY A. FRANK
EUGENE FINDL
MARTIN G. KLEIN
BY
ATTORNEYS

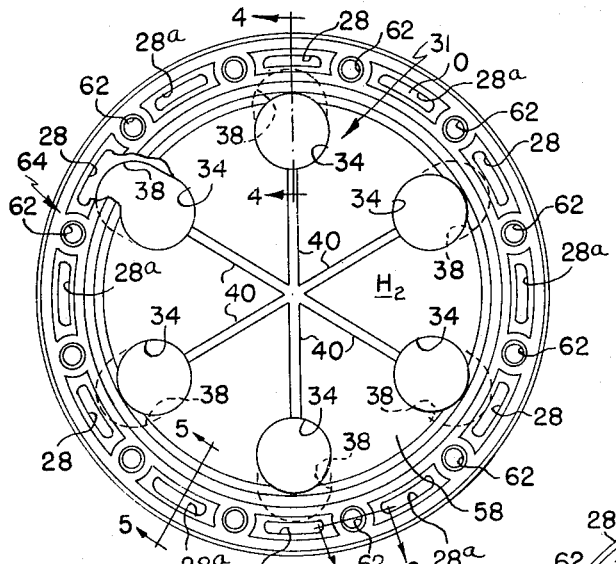
FIG.3
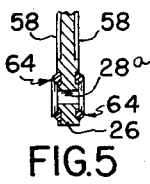
FIG.5
FIG.6
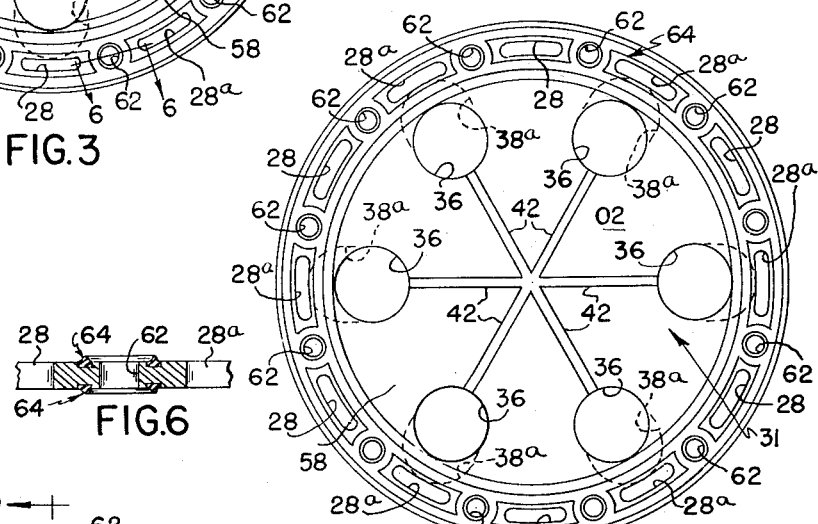
FIG.4
FIG.7
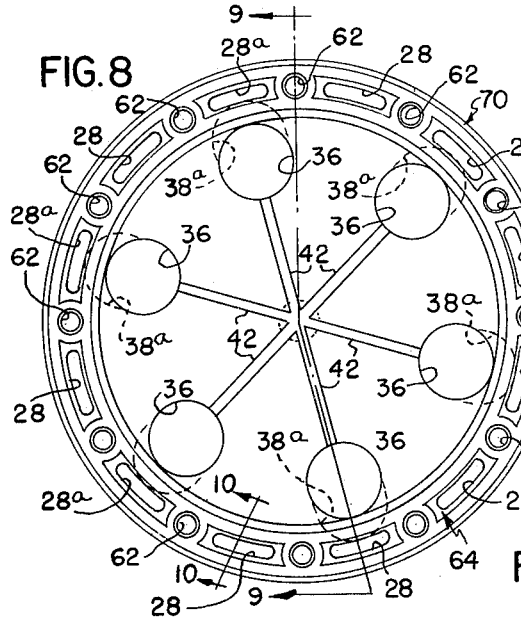
FIG.8
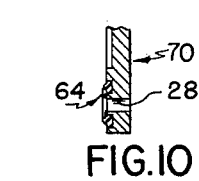
FIG.10
FIG.9
INVENTORS
BERNARD M. WILNER
HARVEY A. FRANK
EUGENE FINDL
MARTIN G. KLEIN
BY
ATTORNEYS

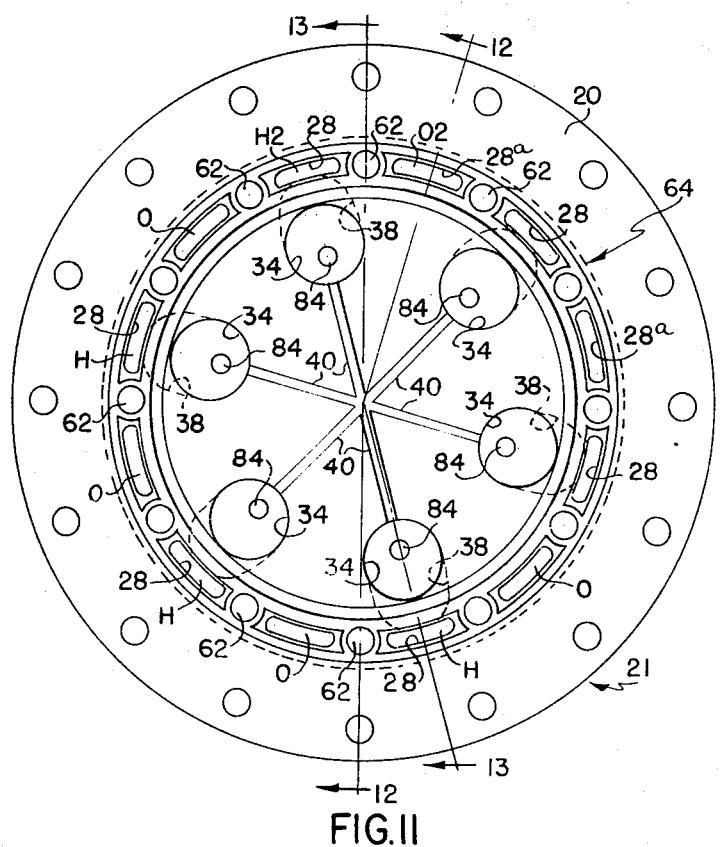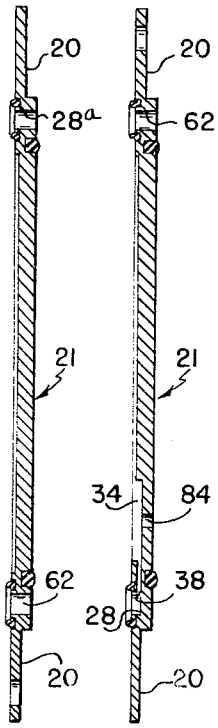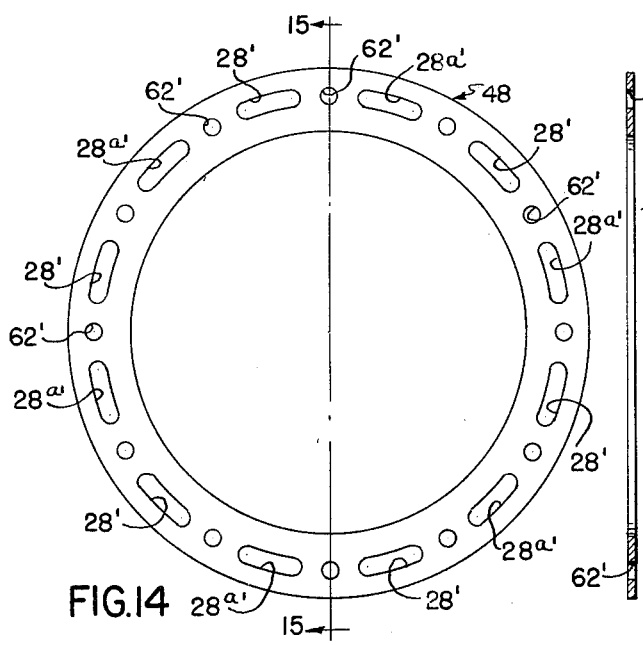

United States Patent Office 3,507,704
Patented Apr. 21, 1970

3,507,704
ELECTROLYTICALLY REGENERATIVE HYDROGEN-OXYGEN FUEL CELL
James E. Webb, Administrator of the National Aeronautics and Space Administration, with respect to an invention of Bernard M. Wilner, West Covina, Harvey A Frank, Pasadena, Eugene Findl, Granada Hills, and Martin G. Klein, Sunnyvale, Calif.
Filed May. 17, 1967, Ser. No. 640,457
Int. Cl. H01m 27/02
U.S. Cl. 136—86                            4 Claims

ABSTRACT OF THE DISCLOSURE

The fuel cell comprises a plurality of bi-polar electrically conductive plates each of which has a rim portion having transversely extending slots therein forming passages for gas flow in a direction perpendicular to the plane of the plate. On one side of the plate a plurality of circumferentially spaced depressions are provided generally adjacent alternate of said slots. Each depression is connected to one diametrically opposite it by a groove in the plate resulting in a radial-spoked pattern. A thin passage disposed in the plate extends between each depression and the respective slot to which it is adjacent. The same pattern of depressions and grooves is provided on the other side of the plate and the depressions on said other side communicate with the remaining second set of alternate slots in the rim through thin passages in the plate. An electrolyte containing nonconductive mat is sandwiched between each bi-polar plate and the bi-polar plate adjacent thereto and in compressed condition between the opposing hydrogen and oxygen electrodes of the adjacent plates. Integral gas storage means are provided with a coacting bellows arrangement for equalizing the gas pressure in the storage means.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates in general to fuel cells and more particularly to a regenerative-type fuel cell.

Regenerative-type fuel cells are known in the prior art. One such regenerative-type cell is disclosed in U.S. Patent No. 3,132,972, issued May 12, 1964 to Frank A. Ludwig.

The present invention is directed to a self-contained electrolytically regenerative fuel cell with integral, but separate storage for the electrolyte and each of the gases utilized, and more particularly a fuel cell which includes bi-polar plates incorporating gas manifold means and distribution means therein for providing for the effective flow of the utilized gases and of the gases produced at the electrodes, to and from the electrodes and the storage areas of the cell. During discharge of the cell, the stored gases are recombined at the electrodes. The same electrodes serve as the reacting surfaces for both the charge and discharge mode of operation.

While bi-polar electrodes for fuel cells are known in the art, and for instance as illustrated in U.S. Patent 2,969,315 issued Jan. 24, 1961 to F. T. Bacon, the present arrangement provides an improved arrangement of bi-polar plates which eliminate prior art problems of leaks, gas distribution, matrix assembly, and compression problems. The present fuel cell arrangement also eliminates differential pressure gradients in the unit, thereby preventing undesirable thermochemical reactions.

Accordingly, an object of the invention is to provide a novel regenerative type of fuel cell.

Another object of the invention is to provide a compact and efficient regenerative-type fuel cell having a long life and reliability, with integral storage areas for the reactants and the products.

A further object of the invention is to provide a novel regenerative-type fuel cell having integral storage areas therein and including bi-polar plates, each of which has sets of transversely extending slots in the rim thereof for gas flow, with gas distribution means formed in a side of the plate and communicating with respective of said slots for effective distribution of the fuel and oxidizing gases to and from the electrodes and the storage areas of the cell.

Other objects and advantages of the invention will be apparent from the following description taken in conjunction with the accompanying drawings wherein:

FIGURE 1 is a generally diagrammatic partially broken longitudinal sectional view of a regenerative fuel cell constructed in accordance with the present invention;

FIGURE 2 is a diagrammatic illustration of the regenerative fuel cell and schematically showing the bi-polar plates, the asbestos electrolyte mat and the passage means for transmittal of the gases to and from the electrodes;

FIGURE 3 is an elevational view of one of the bi-polar plates and illustrating the hydrogen electrode side thereof;

FIGURE 4 is an enlarged fragmentary, sectional view taken generally along the plane of line 4—4 of FIGURE 3 looking in the direction of the arrows;

FIGURE 5 is a fragmentary sectional view taken generally along the plane of line 5—5 of FIGURE 3 looking in the direction of the arrows;

FIGURE 6 is a fragmentary sectional view taken generally along the plane of line 6—6 of FIGURE 3 looking in the direction of the arrows;

FIGURE 7 is an elevational view of the opposite side of the bi-polar plate shown in FIGURE 3, and more particularly the oxygen electrode side;

FIGURE 8 is an elevational view of one of the end plates of the fuel cell;

FIGURE 9 is a sectional view taken generally along the plane of 9—9 of FIGURE 8 looking in the direction of the arrows;

FIGURE 10 is a fragmentary sectional view taken along the plane of line 10—10 of FIGURE 8;

FIGURE 11 is an elevational view of the other end plate of the fuel cell;

FIGURE 12 is a sectional view taken generally along the plane of line 12—12 of FIGURE 11 looking in the direction of the arrows;

FIGURE 13 is a sectional view taken generally along the plane of line 13—13 of FIGURE 11 looking in the direction of the arrows;

FIGURE 14 is an elevational view of one of the insulating spacer plates which separate the bi-polar plates;

FIGURE 15 is a vertical sectional view taken generally along the plane of line 15—15 of FIGURE 14 looking in the direction of the arrows;

FIGURE 16 is a diagrammatic longitudinal sectional view of the bellows assembly adapted for attachment to the fuel cell module for equalizing the gas pressures in the storage areas.

The regenerative fuel cell of the invention is basically a combination hydrogen/oxygen primary fuel cell and a water electrolysis cell in one compact package. During the charge mode of operation, water contained with an absorbent matrix (such as asbestos) separating the hydrogen and oxygen electrodes of adjacent bi-polar electrode plates is electrolyzed, to produce hydrogen and oxygen at the respective electrode. As gas is evolved, it is fed by fluid distribution means and manifold passageway means in the bi-polar plates, to storage tank areas integral with the fuel cell. During discharge, the stored gases are recombined at the electrodes to form water, which returns to and is absorbed by the asbestos matrix. The same electrodes serve as the reacting surface for both the charge and discharge modes of operation. Concentrated aqueous electrolyte, such as concentrated aqueous potassium hydroxide is contained in the aforementioned asbestos matrix, and serves as the electrolyte and the source of water for electrolysis. The quantity of electrolyte employed is such that the solution is totally absorbed by the asbestos matrix, and no free liquid exists within the system. With the integral storage tankage sections, there is no flow of materials in and out of the unit and it is operated as a sealed or closed mechanism.

Referring now to FIGURE 1 there is disclosed a gas-tight housing 10 comprising cylindrical section 12 having closed end 12a and a cylindrical section 14 likewise comprising a closed end 14a, with sections 12 and 14 being bolted or secured to one another as at 18. Sealing means 19 coacting between the sections 12 and 14 and the flange 20 of end plate 21 (FIG. 11) of the fuel cell module 22, insure that the housing is maintained in sealed relationship. Section 12 of the housing may be adapted to store the fuel gas or hydrogen while section 14 may store the oxidizing gas or oxygen. A bellows mechanism 24 may be disposed in section 14 and internally thereof may communicate with section 12.

Referring to FIGURE 2 which schematically illustrates the fuel cell module construction, the latter may comprise a plurality of bi-polar plates 26 which have integral transverse manifold channels or slots 28, 28a therethrough (FIGS. 4 and 5) with hydrogen and oxygen electrodes 30, 32 being disposed between and preferably attached to the bi-polar plates 26. As can be best seen in FIGS. 3 and 7, slots 28 are alternated with slots 28a along the rim of each plate 26. Gas distribution means 31 is formed in the sides of the plates for uniform movement of the gases to and from the respective electrodes. Such gas distribution means, in the embodiment illustrated, comprises depressions 34 (FIGURE 3) in the hydrogen side of the bi-polar plates and depressions 36 (FIGURE 7) in the oxygen side of the bi-polar plate. Such depression means are communicated with the respective gas transmitting slots by internal passages 38, 38a extending between each depression 34 or 36 and the respective rim slot 28 or 28a. The depressions 34, 36 in the respective side of the plate are preferably coupled together by channels 40, 42 in the respective side of the plate. An asbestos mat 45 (FIGURE 2) is placed between each set of opposing electrodes 30, 32, and a ring-like insulating spacer member 48 is disposed between adjacent bi-polar plates, and is employed to obtain the desired compression of the asbestos mats 45. The integral gas distribution means 31 and manifolding 28, 28a permits hydrogen and oxygen gas to flow out from behind the back side of the respective electrode through the manifold passages 28, 28a and into the respective gas storage compartment 50 and 52 disposed in housing 10. As aforementioned in the arrangement illustrated, the end plate 21 of the fuel cell stack or module 22 separates the oxygen storage section 52 from the hydrogen storage section 50.

Fuel cell grade asbestos may be utilized for the asbestos mats 45, each having a dry thickness of approximately 0.060 inch. Such mat is preferably compressed, as aforementioned during cell assembly, to approximately 0.04 inch. This compression decreases the cross leakage of hydrogen and oxygen gases through the mat, and causes a partial penetration of the electrolyte in the bed or mat into each of the opposing electrodes.

During charging of the fuel cell, or in other words electrolysis, water may be decomposed from the mat at the rate of approximately 0.336 gram per ampere-hour of charge. Limitations exist as to the extent of charging, aside from the obvious one of increase resistance due to loss of ionic convectivity. If the charge is continued, cross leakage of hydrogen and oxygen through the asbestos matrix may become appreciable. This cross leakage results in water formation chemically at the electrodes. At the limit, the water formation rate due to cross leakage equals that due to electrolysis, resulting in the formation of heat.

During discharge, water is formed that is absorbed by the asbestos matrix. Excessive rapid formation of water will result in flooding of the reaction zones, and a decrease in performance. The effects and limitations of the system in regards to drying out towards the end of the charge, and flooding towards the end of the discharge, are mass transport, rate dependent processes. Slower rates of charge and discharge allow the use of higher capacities without encountering performance fall-offs.

Since the electrodes 30, 32 serve both in the charge and discharge operations, their construction is preferably somewhat different from that of an electrode used exclusively for either a charge or discharge operation. From a purely electrolysis standpoint it is desirable to have a nearly flooded system, whereas for the primary cell operation a somewhat dryer reacting surface is usually desirable. A suitable type of electrode (many of which are known in the art) may comprise a porous plaque that is fabricated by sintering carbonyl nickel powder, evenly spread over a nickel screen. The plaques employed may be approximately 0.020 inch thick. These plaques may then be catalyzed with platinum black to loadings of 20 mgs. $Pt/cm.^2$. As opposed to primary cells, it appears that the reaction zone within the electrodes of the regenerative cell of the invention, shifts in and out as the water content in the asbestos mats change during the charge and discharge cycles. By utilizing an electrode catalyzed in depth, peak performance can be obtained over a longer period of charge and discharge.

Gas distribution screens 55 (FIGURE 2) of known type may be attached as by spot welds to the bi-polar plates in recesses 58 formed of for instance perforated nickel sheets or nickel gauze of fine mesh. The catalyzed electrodes may then be spot welded or otherwise attached to the gas distribution screens, with a hydrogen electrode 30 on one side of the bi-polar plate, and an oxygen electrode 32 disposed on the other side of the plate. The electrolyte saturated asbestos mat 45 is then oriented and compressed between the electrodes on adjacent plates. The bi-polar plate assemblies are stacked alternately or more specifically until the desired number of cells are obtained to form the fuel cell module, with alternate hydrogen and oxygen electrodes.

Stacking may be accomplished by assembling the bi-polar plate assemblies on a series of insulated bolts 60 disposed through holes 62 around the periphery of the bi-polar plates 26. Bolts 60 may be insulated by a sleeve of Teflon. The bi-polar plates 26 mount gas seals or gaskets 64 on opposite sides thereof which prevents inter-cell gas mixing via the oxygen and hydrogen gas manifold slots or channels 28a, 28. Seals 64 may be formed of rubber and have openings therein for encompassing the gas slots 28, 28a and the bolt openings 62 in the plates, thus sealing the oxygen and hydrogen slots which are adapted for conveying the fuel and oxidizing gases to and from the storage areas and the electrodes, when the bi-polar plate assemblies are disposed in assembled stacked relation in the fuel cell module. The plates 26 may have recesses formed therein as best seen in FIGURES 4 and 6, for mounting seals 64.

Bolts 60 may have spring assemblies 66 (FIGURE 2) such as Belleville springs, coacting between the head 68 of each bolt and the end plate 70 of the fuel cell module, for aiding in holding the bi-polar plates in assembled relation. Insulating washers 72 (FIGURE 1) may coact between the end ring 74 of the bellows assembly 24 and the threaded holding nuts 76 on bolts 60, for insulating the bolts 60 from end plate 21.

Slots 28, 28a are preferably located in the spaces between the bolt holes 62, as best seen in FIGURES 3 and 7. Circular depressions 34, 36 preferably have diameters roughly equal to the cord length of the respective curved slots 28, 28a. Each depression 34 or 36 is connected to the one diametrically opposite it by the aforementioned channel or groove 40 or 42 in the plate, resulting in the and 7. Each channel 40 or 42 is preferably of a lesser generally radial-spoke pattern illustrated in FIGURES 3 and 7. Each channel 40 or 42 is preferably of a lesser depth than the associated depression 34 or 36.

Referring to FIGURE 7 which illustrates the opposite or oxygen side of the bi-polar member 26, the pattern of depressions 36 and grooves 42 for conveyance of the oxidizing gas is rotated about an axis perpendicular to the plate, so that the depressions 36 on such other side are not aligned with those (e.g. 34) on the FIGURE 3 side but instead are staggered with respect thereto. Depressions 36 communicate with the curved slots 28a through the relatively thin passages 38a in the plate, and in a manner generally similar to those for the depressions 34 on the FIGURE 3 side. Both sides of said bi-polar plate member have recesses therein formed complementary to the gasket 64 and receiving the latter in mounted relation, and which completely encircles each of the bolt holes 62 and the curved slots 28, 28a in the plate, thus preventing inter-cell gas mixing via the oxygen and hydrogen manifolds.

As shown for instance in FIGURE 1, the bi-polar plates are alternated with the spacers 48 (FIGURES 13 and 14) in a stack, with such spacers being formed of an insulating material such as, for instance, fiberglass combined with a suitable resin. Spacers 48 have slot openings 28' and 28a' formed complementary to the manifold openings 28 and 28a in the bi-polar plates, and bolt openings 62' formed complementary to bolt openings 62 in the plates 26. The gaskets 64 on the plates are adapted to engage in sealing relation about the openings 28', 28a' and 62' on the intermediate spacers 48. In the embodiment illustrated there are twelve bolts utilized for holding the bi-polar plates and associated electrodes and spacers in stacked condition. An insulating sheath 80, formed of some electrical insulating material, such as Teflon, may completely encircle the fuel cell module, as shown in FIGURE 1.

The aforementioned end plates 21 and 70 (FIGURES 11 and 8) of the stack are similar to the bi-polar plates 26 except that no gas distribution means or in other words depressions or channels arep rovided in their outer sides. The manifold slot means 28 for carrying the hydrogen gas, as can be seen in FIGURES 9 and 10, extend through end plate 70 and communicate with the storage area 50 which is adapted to store the hydrogen gas therein. The oxygen manifold slot means 28a dead-end at the end plate 70 and thus there is no communication between the oxygen depressions 36 and associated passages 38a, and the hydrogen gas storage area 50. Sealing means 82 coacting between the bolts 60 and end plate 70 seal the bolt openings 62 in plate 70 from the gas storage area 50.

End plate 21 has the gas manifold slots 28a which are adapted to carry the oxidizing gas, extending completely through the plate 21 as best shown in FIGURE 12, thus communicating the manifold slots 28a with the storage area 52 of the housing 10, such storage area 52 being adapted to store the oxygen gas therein. The hydrogen slots 28 dead-end at plate 21, with such hydrogen slots being connected by the passages 38 (FIGURES 11 and 13) to the hydrogen depressions 34 in the inner side of plate 21. As can be seen in FIGURE 13, such depressions 34 in plate 21 have apertures 84 extending from the respective depression through the plate thus communicating depressions 34 and the hydrogen slots 28 with the interior of bellows assembly 24, which is secured to end plate 21 by the aforementioned bolts 60 and co-acting nuts 76. It will be seen therefore that the hydrogen storage area 50 is in communication with the interior of the bellows assembly 24 by means of the manifold slots 28 and communictaing depressions 34 in plate 21.

The bellows assembly 24, as aforementioned, equalizes the pressure between the two volumes of gas in the housing thus minimizing pressure differentials across the cell. The state of charge in the housing may be monitored via a conventional pressure transducer 86 (FIGURE 1), and the charge may be limited by a conventional charge limit switch 88, when the desired tank pressure is reached. The bellows assembly, which may be of flexible accordion-like construction, may be secured as by means of its ring-like end plate 74 (FIGURE 16) to the end plate 21 of the fuel cell module, and with the other end plate 90 of the bellows assembly being an imperforate member, thus isolating the interior of the bellows assembly from the exterior oxygen storage area 52. Certain of the bolts 60 may extend through the end plate 21 as illustrated in FIGURE 1 and there may be provided a stop plate 92 secured as by means of nuts 94 to the supporting bolt extension portions 95, for limiting the expansion of the hollows assembly. It will be understood that if and when end plate 90 of the bellows assembly engages abutment 92, no further expansion can occur.

End plate 70 may have a stud 96 attached thereto for positive terminal lead 98, while the housing 10 may be the negative terminal of the fuel cell.

In conventional batteries, cycle life is limited by the changes in the physical or chemical states of the electrode reactant, such as dendritic growths, flaking off of reactive components and irreversible side reactions. As charge and discharge proceed, the density changes in the active material causing flaking, crumbling and loss of active material. Full utilization cannot be made of all of the active material because some is covered over and buried in the depths of the electrodes. These conditions necessitate the use of shallow depth discharges in conventional batteries to obtain a long cycle life. Since the reactive components of the fuel cell of the invention are in gas phase, performance limitations due to conditions noted above do not apply.

The normal operating temperature for the unit is approximately 70° to 90° C. For multi-cell units this temperature can usually be maintained by the heat rejected during the operation thereof. Of course, this will be dependent upon the ambient temperature, mounting insulation and type of operating cycle. Optimum cell operation generally occurs between approximately 80° C. to 100° C. when cycle life is considered.

From the foregoing discussion and accompanying drawings it will be seen that the present invention provides a self-contained electrolytically regenerative fuel cell with integral but separate storage areas for the electrolyte and each of the gases utilized. The fuel cell embodies bipolar plates possessing integral manifold means for conveying the fuel and oxidizing gases to and from the storage areas of the cell, and also embodying gas distribution means in the plates, for effective and uniform exposure of the electrodes and reacting areas to the fuel and oxidizing gases. Gas leakage problems and gas distribution problems are materially improved, resulting in improved reliability and efficiency of the fuel cell.

The terms and expressions which have been used are used as terms of description and not of limitation, and there is no intention, in the use of such terms and expressions, of excluding any equivalents of any of the features shown or described, or portions thereof, and it is recognized that various modifications are possible within the scope of the invention claimed.

What is claimed is:

1. In a regenerative fuel cell comprising at least one pair of adjacent bi-polar electrode plates, each of said plates having a porous electrode on a side thereof disposed in generally opposed relation to the electrode on the adjacent plate, a non-conducting porous bed between and in contact with said electrodes, said bed being adapted to hold an electrolytic solution therein, insulating means separating said electrode plates, and means in each of said plates providing fluid passage means communicating with the respective electrode from exteriorly of said plate, said last named means comprising spaced depressions in both sides of said plates spaced circumferentially about said plate and slots extending transversely through said plates adjacent the perimeters thereof, and passages in said plates connecting certain of said slots with said depressions on one side of each plate, the other of said slots being connected to said depressions on the other side of each plate, and channels on each side of said plate connecting all of said depressions on the respective side together, said channels extend radially from the axial center of said plate to a respective one of said depressions providing a spoke-like arrangement of fluid passage means.

2. In a regenerative fuel cell comprising at least one pair of adjacent bi-polar electrode plates, each of said plates having a porous electrode on a side thereof disposed in generally opposed relation to the electrode on the adjacent plate, a non-conducting porous bed between and in contact with said electrodes, said bed being adapted to hold an electrolytic solution therein, insulating means separating said electrode plates, and means in each of said plates providing fluid passage means communicating with the respective electrode from exteriorly of said plate, gas storage means communicating with said fluid passage means for storing fuel and oxidizing gases during regeneration of said cell, and an extensible and contractable bellows assembly coacting between said storage means for equalizing the pressure between the gases in said storage means.

3. A fuel cell in accordance with claim 2 wherein said means comprises depression means extending in the plane of said plate and slot means extending transversely of said plate, and passage means connecting said slot means with said depression means, said passage means extending in the plane of said plate.

4. A fuel cell in accordance with claim 3 wherein said plate has said depression means on both sides thereof with the depression means on one side being off-set with respect to the depression means on the other side, and with the depression means on each side communicating respective of said slot means in said plate, and end plates coacting with a stack of said bi-polar plates, said end plates having depression means on only the inner sides thereof.

References Cited

UNITED STATES PATENTS

| | | | |
|---|---|---|---|
| 2,070,612 | 2/1937 | Niederreither | 136—86 |
| 2,928,783 | 3/1960 | Bacon | 204—256 X |
| 2,969,315 | 1/1961 | Bacon | 136—86 X |
| 3,068,311 | 12/1962 | Chambers et al. | 136—86 |
| 3,188,242 | 6/1965 | Kordesch et al. | 136—86 |
| 3,202,546 | 8/1965 | Rightmire et al. | 136—86 |
| 3,242,065 | 3/1966 | De Nora et al. | 204—256 |
| 3,278,336 | 10/1966 | Uline et al. | 136—86 |
| 3,288,652 | 11/1966 | Leavitt | 204—256 X |
| 3,411,951 | 11/1968 | Gelting | 136—86 |

ALLEN B. CURTIS, Primary Examiner